United States Patent [19]
Kawaguchi et al.

[11] 3,738,708
[45] June 12, 1973

[54] BRAKE PRESSURE CONTROL VALVE
[75] Inventors: Hiroshi Kawaguchi; Ryujiro Furukawa, both of Toyota, Japan
[73] Assignee: Toyota Jidosha Kogyo Kabushiki Kaisha, Toyota-shi, Aichi-ken, Japan
[22] Filed: Mar. 13, 1972
[21] Appl. No.: 233,975

[30] Foreign Application Priority Data
Oct. 11, 1971 Japan.................................. 46/80053

[52] U.S. Cl.............. 303/6 C, 60/54.5 E, 188/349, 303/84 A
[51] Int. Cl..................................... B60t 13/00
[58] Field of Search........................ 303/6 C, 84 A; 188/349; 60/54.5 E

[56] References Cited
UNITED STATES PATENTS
| | | | |
|---|---|---|---|
| 3,671,080 | 6/1972 | Kawaguchi | 303/6 C |
| 3,532,390 | 10/1970 | Bueler | 303/6 C |
| 3,586,384 | 6/1971 | Falk | 303/84 A X |
| 3,501,203 | 3/1970 | Falk | 303/6 C |

Primary Examiner—M. Henson Wood, Jr.
Assistant Examiner—Michael Mar
Attorney—Richard K. Stevens, Davidson C. Miller, Ellsworth H. Mosher et al.

[57] ABSTRACT

A brake pressure control valve for a vehicle brake system which comprises a cylinder, a differential piston slidably disposed within the cylinder to subdivide the cylinder interior into first and second chambers facing piston surfaces of different areas and connected respectively to a master cylinder and to rear-wheel brake cylinders, a valve cooperable with the piston to control the intercommunication between the two chambers by way of hydraulic pressure differences produced by the piston, and a first spring biasing the piston to keep the valve normally open. The brake pressure control valve further comprises an assistant plunger slidably engaged within the piston to subdivide the piston interior into third and fourth chambers, the third chamber being in open communication with the first chamber and the fourth chamber being connected to the second chamber, and a second spring normally biasing the plunger in a direction to axially unite the plunger with the piston, the urging force of the second spring being smaller than that of the first spring.

9 Claims, 4 Drawing Figures

BRAKE PRESSURE CONTROL VALVE

BACKGROUND OF THE INVENTION

The present invention relates to a hydraulic brake system for a vehicle, and more particularly to a hydraulic brake pressure control valve disposed within a hydraulic circuit between a master cylinder and rear-wheel brake cylinders to make the braking force distribution ratio between the front and rear wheel brake cylinders as close as possible to the ideal distribution ratio characteristic curve.

A hydraulic brake pressure control valve of the kind is to start operation thereof to decrease the increasing ratio of pressure supplied to the rear wheel cylinders when the pressure reaches a certain predetermined value. As a result, the braking force distribution ratio between the front and rear-wheel cylinders may get closer to the ideal distribution curve to prevent dangerous rear skids of the vehicle caused by earlier locking of the rear-wheels which undesiredly happens in the braking operation of the vehicle because of the transferring of the vehicle loads toward the front-wheels.

In the prior art, such a pressure control valve has been introduced so as to obtain the best possible braking force distribution ratio by way of controlling relative relations between the front-wheel cylinder pressure and the rear-wheel cylinder pressure in two pressure ranges wherein two characteristic straight line segments are obtainable against the ideal distribution characteristic curve. In the control valve provided with said approximate two characteristic straight line segments, however, it has been next to impossible to let the relative relations between the front and the rear wheel cylinders correspond satisfactorily with the ideal distribution characteristic curve.

Another improved control valve has also been disclosed, in which the relative relations between the pressures in the front and rear-wheel cylinders are controlled in three pressure ranges, wherein three characteristic straight line segments are obtainable against the ideal distribution characteristic curve. Although the control valve of this type has a much better brake pressure controlling characteristic than that of the valve with said approximate two characteristic straight line segments, the construction becomes remarkably complicated with a number of additional parts which increase the production cost and decrease durability of the device.

SUMMARY OF THE INVENTION

A prime object of the present invention is, therefore, to provide a brake pressure control valve for a vehicle, wherein a braking force distribution ratio between the front and rear-wheel cylinders becomes closest to the ideal distribution curve, thereby possibly preventing dangerous rear skids of the vehicle caused by earlier locking of the rear road-wheels.

Another object of the present invention is to provide a brake pressure control valve for a vehicle, having the above-mentioned features, wherein the braking force distribution characteristics are obtained in three pressure ranges by means of three characteristic straight line segments and the proportioning operation of the valve can accurately be maintained even at a sudden and rough or panic brake operation.

Still another object of the present invention is to provide a brake pressure control valve for a vehicle, having the above-mentioned features, wherein the construction of the device is very simple with a small number of parts yet the device is durable.

A further object of the present invention is to provide a brake pressure control valve for a vehicle, having the above-mentioned features, wherein a prior art control valve is utilizable with an assistant plunger assembly additionally provided therein.

It is still an object of the present invention to provide a brake pressure control valve for a vehicle, having the above-mentioned features, wherein the braking force distribution ratio can easily be designed by way of proper selection of a diameter of the assistant plunger and the biasing force therefor.

According to the present invention briefly summarized, there is provided a brake pressure control valve which comprises a cylinder having an inlet port and an outlet port thereon, a differential piston slidably disposed within the cylinder to subdivide the cylinder interior into first and second pressure chambers facing piston surfaces of different areas and connected respectively to a master cylinder of a vehicle through the inlet port and to rear-wheel brake cylinders through the outlet port, valve means disposed between the first and second chambers to cooperate with the piston for controlling the intercommunication of the first and second chambers, first spring means for biasing the piston in the direction to keep the valve means normally open, an assistant plunger slidably engaged within the piston to subdivide the piston interior into third and fourth chambers, the third chamber being connected with the first chamber and the fourth chamber being hydraulically connected to the second chamber, second spring means for normally biasing the plunger in a direction to axially unite the plunger with the piston, the urging force of the second spring means being smaller than that of the first spring means, whereby the intercommunication between the first and second chambers is controlled by the valve means by way of united displacements of the piston and the plunger till the wheel brake cylinder pressure reaches a first predetermined value and is controlled by the valve means only by way of displacements of the piston freed from the plunger after the wheel brake cylinder pressure exceeds a second higher predetermined value.

BRIEF DESCRIPTION OF THE DRAWINGS

Additional objects and advantages of the present invention will be more readily apparent from the following detailed description of embodiments thereof when taken together with the accompanying drawings in which.

DESCRIPTION OF THE PREFERRED EMBODIMENTS

Figure 1:
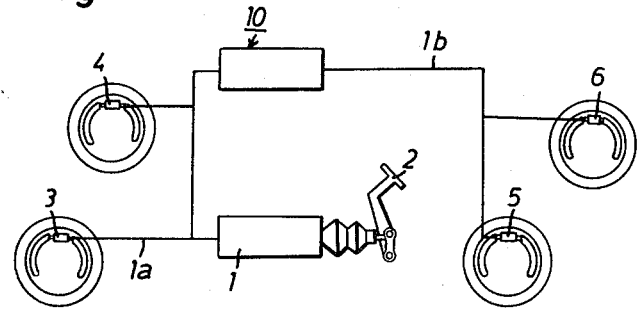
FIG. 1 is a schematic diagram of a hydraulic brake system of a vehicle to show the installation arrangement of a hydraulic brake pressure control valve in accordance with the present invention.

Reference is made now to FIG. 1 of the accompanying drawings, wherein a general configuration of constructive elements of a hydraulic brake system is diagrammatically disclosed, a preferred embodiment of a hydraulic brake pressure control valve of the present invention being included therein.

A master cylinder 1 is operably connected with a brake foot-pedal 2 so as to produce hydraulic braking pressure in response to depression of the brake pedal 2. A first hydraulic conduit 1a produces direct communication between the master cylinder 1 and front-wheel brake cylinders 3, 4. The master cylinder 1 is also connected to rear-wheel brake cylinders 5, 6 by way of the first conduit 1a, the brake pressure control valve 10 of the present invention and a second hydraulic conduit 1b. Thus, hydraulic pressure produced in the master cylinder 1 is delivered directly to the front-wheel cylinders 3, 4 and at the same time to the rear-wheel cylinders 5, 6 after being regulated by the control valve 10.

Figure 2:
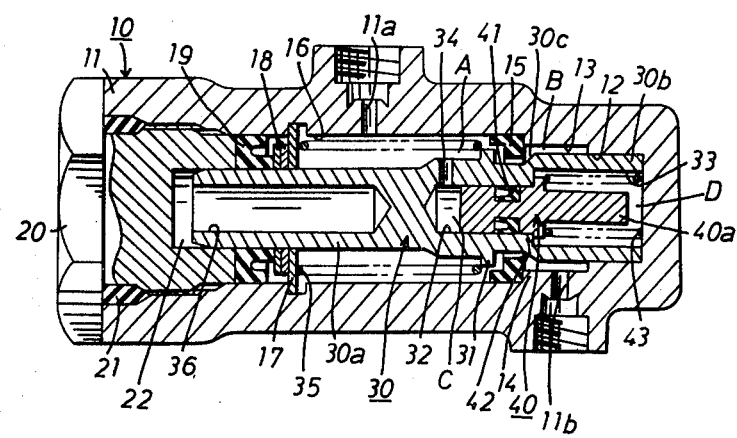
FIG. 2 shows a view of the elevational cross-section of an embodiment of the present invention.

Referring now to FIG. 2 for the detailed construction of the control valve 10, there is shown a housing 11 provided with a hydraulic inlet port 11a and a hydraulic outlet port 11b respectively in communication with the master cylinder 1 through the conduit 1a and with the rear-wheel cylinders 5, 6 through the conduit 1b. The housing 11 includes therein a stepped cylindrical bore which comprises a small diameter portion 12, a medium diameter portion 13 in open communication with the outlet port 11b and a large diameter portion 16 in open communication with the inlet port 11a. An annular valve seat 15 is securely fixed on an annular shoulder portion 14 formed at the right end of the large diameter portion 16 in the figure. The opening of the large diameter portion 16 at the left end thereof in the figure is closed up by means of a plug 20 threaded into the cylindrical bore of the housing 11 through an annular sealing member 21.

A differential piston 30 is disposed within the cylindrical bore of the housing 11 for axial reciprocation. A large diameter portion 30b of the differential piston 30 axially and slidably engages with the small diameter bore 12 of the housing 11. A small diameter portion 30a extends into the medium and large bores 13 and 16 so as to axially and slidably engage with a counter bore 22 drilled within the plug 20 through an annular sealing cup 19. Consequently, a first pressure chamber A is formed by the outer periphery of the small diameter portion 30a of the piston 30 within the large diameter bore 16 of the housing 11. And a second pressure chamber B is formed by the outer periphery of the large diameter portion 30b of the piston 30 within the medium diameter bore 13 of the housing 11. The first and second pressure chambers A and B are respectively in constant communication with the inlet and outlet ports 11a and 11b of the housing 11. A coiled compression spring 35 for normally biasing the piston 30 rightward in the figure is stretched between an annular flange 31 provided on the piston 30 and a stop clip 17 counter sunk in the wall of the large diameter bore 16 at the left end thereof. Annular spacers 18 are interposed between the stop clip 17 and the sealing cup 19.

The large diameter portion 30b of the piston 30 merges in the small diameter portion 30a through an annular tapered valve face 30c provided inbetween the two portions 30a and 30b. This valve face 30c conducts an opening and closing operation against the valve seat 15 in accordance with the reciprocation of the piston 30 raised against resilient force of the compression spring 35 by a hydraulic pressure acting on the effective surface difference between the small diameter and large diameter portions 30a and 30b of the piston 30. The effective pressure-receiving area of the small diameter portion 30a is equal to the cross-sectional area ($S_1$) of the small diameter portion 30a. And the effective pressure-receiving area of the valve face 30c is measured by the cross-sectional area ($S_2$) of the internal diameter portion of the valve seat 15. An atmospheric chamber is formed between the counter bore 22 of the plug 20 and a counter bore 36 drilled within the small diameter portion 30a of the piston 30 to open constantly against the counter bore 22.

An assistant plunger 40 is reciprocably engaged through a sealing cup 41 in a co-axial cylindrical bore 32 provided within the small diameter portion 30a at the right side thereof. The bore 32 opens to a co-axial cylindrical bore 33 drilled within the large diameter portion 30b of the piston 30 and the tail portion of the plunger 40 extends into the bore 33. The plunger 40 forms within the bore 32 a third pressure chamber C which is in constant communication with the first pressure chamber bore 33 a radial port 34 drilled on the differential piston 30. The plunger 40 is normally biased leftward in the figure by a coiled compression spring 43 of which one end is seated on the inner vertical wall of the housing 11. Resilient force of the compression spring 43 is predetermined at a certain value less than that of the compression spring 35. Thus, the plunger 40 is conditioned to engagement with an annular shoulder portion 42 provided at the left end portion of the bore 33 while the hydraulic pressure within the third pressure chamber C is less than the resilient force of the compression spring 43. A pressure chamber D formed within the BORE is hydraulically connected to the second pressure chamber B through an annular slit passage defined by the outer periphery of the large diameter portion 30b of the piston 30 and the circumferential wall of the small diameter bore 12 of the housing 11.

Figure 4:
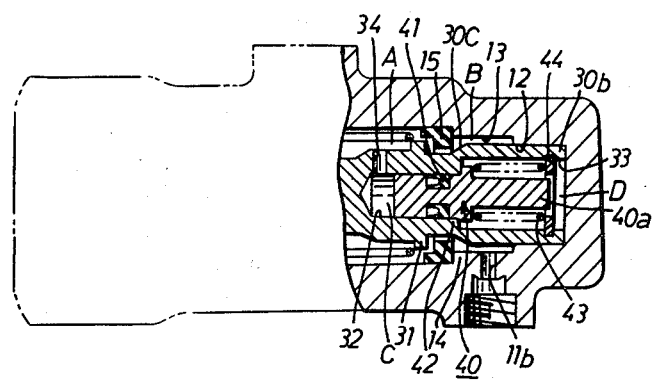
FIG. 4 shows a partial cross-section similar to FIG. 2 of another embodiment of the present invention.

The compression spring 43 provided with the abovedescribed function may be stretched between the plunger 40 and the vertical inner wall of the housing 11 or between the plunger 40 and a stop member 44 mounted on the inside wall of the right end portion of the piston 30 as shown in FIG. 4.

In the control valve 10 constructed as mentionedabove, the piston 30 is normally thrusted onto the inner vertical wall of the housing 11, as well illustrated in FIG. 2, by the difference of the resilient forces between the compression springs 35 and 43, the thrusting force being measured by a formula of "Resilient Force of the spring 35 — Resilient Force of the spring 43."

Figure 3:
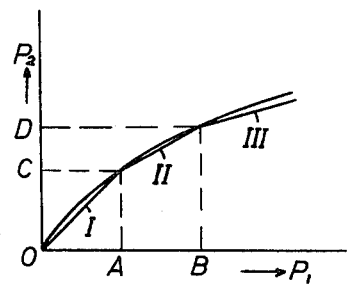
FIG. 3 is a graph indicating the pressure controlling characteristics of the hydraulic brake pressure control valve of the present invention.

Operation of the brake pressure control valve constructed in accordance with the above-mentioned preferred embodiment is described hereinafter in detail with reference to FIG. 2 and particularly to FIG. 3. In FIG. 3, a horizontal line or the X-axis indicates rightwardly increases of the hydraulic pressure within the master cylinder, meanwhile a vertical line or the Y-axis indicates upwardly increases of the controlled hydraulic pressure within rear-wheel brake cylinders. The increasing hydraulic pressure within the master cylinder is shown with "$P_1$" and the increasing pressure in the rear-wheel cylinders with "$P_2$." A solid characteristic curve shows the ideal adjustment of the hydraulic pressure supplied into the rear-wheel cylinders in accordance with the increases of the hydraulic pressure in the master cylinder.

The hydraulic pressure produced within the master cylinder 1 by way of depression of the brake pedal 2 is delivered directly to the front-wheel cylinders 3, 4 through the conduit 1a and at the same time to the inlet port 11a of the control valve 10 through the conduit 1a. The pressure delivered to the inlet port 11a, then, flows into the first pressure chamber A from which it is lead to the second pressure chamber B through a space between the valve seat 15 and the valve face 30c of the piston 30. The pressure flow reaches in turn the outlet port 11b to be discharged therefrom and is lead to the rear-wheel cylinders 5, 6 through the conduit 1b. In this operation process, therefore, the increasing ratio of the rear-wheel cylinder pressure $P_2$ against the master cylinder pressure $P_1$ is in direct proportion (1 : 1), which accords with a solid characteristic straight line segment I in FIG. 3.

The depressing actuation onto the brake pedal 2 is increased to make the pressure value higher in the first pressure chamber A through the master cylinder 1 up to a certain pressure predetermined relatively by the resilient force difference between the compression springs 35 and 43 and the cross-sectional area of the small diameter portion 30a of the piston 30. This state is referred to an abscissa A on the X-axis and an ordinate C on the Y-axis in FIG. 3; that is, the end point of the straight line segment I when the master cylinder pressure $P_1$ and the wheel-cylinder pressure $P_2$ reach at a time respectively the "A" value and the "C" value. Now, the differential piston 30 makes a leftward movement together with the plunger 40 against the resilient force of the compression spring 35 by means of hydraulic pressure acting on the effective differential surfaces thereof. This displacement of the piston 30 causes the valve face 30c to close the valve seat 15 so as to block the communication between the first and second pressure chambers A and B. Pressure increase in the first pressure chamber A while the valve seat 15 is closed causes rightward retracting movement of the piston 30 to consequently open the valve seat 15. The closing and opening operation of the valve seat 15 is thus repeated in a vibratory flapping operation.

In this second pressure adjusting process, the increase ratio of the rear-wheel cylinder pressure $P_2$ is in proportion to the master cylinder pressure $P_1$ as indicated with a formula;

$$1 : (1 - S_1/S_2)$$

in which, as previously set forth, "$S_1$" and "$S_2$" indicate respectively the effective pressure-receiving areas of the small diameter portion 30a of the differential piston 30 and the internal diameter portion of the valve seat 15. The above ratio accords with a solid characteristic straight line segment II extending from the upward end of the straight line segment I in FIG. 3.

The assistant plunger 40 engaged within the piston 30 maintains the engagement thereof with the shoulder portion 42 of the piston 30 by way of the biasing force of the spring 43 and moves unitedly with the piston 30 during the above-mentioned pressure adjusting operations. This state is kept till the value of the master cylinder pressure $P_1$ reaches an abscissa B on the X-axis in FIG. 3. The value of the rear-wheel cylinder pressure $P_2$ is at the same time increased up to an ordinate D on the Y-axis. The intersection of a broken line starting upward from the abscissa B and a broken line starting rightward from the ordinate D indicates the upward end of the straight line segment II.

When the master cylinder and rear-wheel cylinder pressures are increased up to the "B" and "D" values respectively, the difference between the hydraulic pressures within the third pressure chamber C and the pressure chamber D exceeds the biasing force of the spring 43. Therefore, the plunger 40 is thrusted rightward to move apart from the shoulder portion 42 of the piston bore 32. Consequently, the piston 30 gets free from the resilient force of the spring 43 acting thereon so far through the plunger 40. Thus, the effective pressure receiving area of the valve face 30c of the piston 30, which is equal to the cross sectional area ($S_2$) of the internal diameter portion of the valve seat 15, is decreased by the cross-sectional area ($S_3$) of the plunger 40. Under this condition, the piston 30 conducts the opening and closing operation of the valve seat 15 in accordance with the increase of the master cylinder pressure $P_1$.

In the pressure adjusting process of the mentioned instance, the increasing ratio of the rear-wheel cylinder pressure $P_2$ is in such proportion to the master cylinder pressure $P_1$ as shown below;

$$1 : 1(1 - S_1/(S_2-S_3)$$

which accords with a solid characteristic straight line segment III in FIG. 3.

Upon removal of the depressing actuation onto the brake pedal 2, the master cylinder pressure shows a rapid decrease and in turn the pressure in the wheel cylinders is released to let the control valve 10 return to the original condition thereof as illustrated in FIG. 2.

It should be very clear through the afore-mentioned description that the present invention is characterized by an assistant plunger with a second one-direction biasing spring installed within a brake pressure control valve comprising a housing and a differential piston engaged reciprocably within the housing and accompanied with a first spring having its biasing force in the opposite direction of that of the second spring. The biasing force of the first spring is predetermined at a certain value and the differential piston is provided with different pressure receiving areas thereon to control by way of its reciprocation opening and closing communication between first and second pressure chambers respectively in open communication with the master cylinder and the raar-wheel brake cylinders. The plunger is operated by the difference of the pressures between the first and second pressure chambers.

Thus, the reciprocation of the piston of the brake pressure control valve in accordance with the present invention is controlled in two hydraulic pressure ranges. Provided thus is a hydraulic brake pressure control valve given with an approximate three-straight-line adjusting characteristic but constructed simply with a small number of additional parts. This control valve serves well to prevent the earlier locking of the rear wheels and in turn the dangerous skids of the vehicle in braking operation, the vehicle being positively and safely arrested in a shorter distance.

Furthermore, in the control valve of the present invention, the adjusting characteristic can easily and accurately be adjusted symply by proper selection of the cross-sectional area of the plunger and/or the biasing force of the second spring. And since the plnger is operated by the difference of the pressures between the first and second pressure chambers, the operation of the plunger is maintained accureately even when the master cylinder pressure is increased rapidly all of a sudden, so that desired accuracy in the pressure adjusting operation is well maintained always.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A brake pressure control valve for a vehicle comprising, in combination, a cylinder having an inlet port and an outlet port thereon; a differential piston slidably disposed within said cylinder to subdivide the cylinder interior into first and second pressure chambers facing piston surfaces of different areas and connected respectively to a master cylinder through said inlet port and to rear-wheel brake cylinders through said outlet port; valve means cooperable with said piston for controlling the intercommunication of said first and second chambers; first spring means for biasing said piston in a direction to keep said valve means normally open; an assistant plunger slidably engaged within said piston to subdivide the piston interior into third and fourth pressure chambers, said third and fourth chambers always being fluid tight relative to each other, said third chamber being in open communication with said first chamber and said fourth chamber always being connected to said second chamber; and second spring means for normally biasing said plunger in a direction to axially unite said plunger with said piston; the urging force of said second spring means being smaller than that of said first spring means.

2. A brake pressure control valve for a vehicle as claimed in claim 1, wherein said second spring means is a coiled compression spring stretched between said plunger and the interior wall of said cylinder within said fourth chamber.

3. A brake pressure control valve for a vehicle as claimed in claim 1, wherein said second spring means is a coiled compression spring stretched between said plunger and an inside portion of said piston within said fourth chamber.

4. A brake pressure control valve for a vehicle as claimed in claim 1, wherein said plunger is provided with a projecting portion extending into said fourth chamber, the displacement of said plunger apart from said piston being regulated by engagement and disengagement of said projecting portion with the cylinder interior wall.

5. A brake pressure control valve for a vehicle as claimed in claim 1, wherein said third chamber is in open communication with said first chamber through a radial port drilled on said piston.

6. A brake pressure control valve for a vehicle as claimed in claim 1, wherein said valve means comprises a valve seat disposed on said cylinder between said first and second chambers and a tapered valve face formed on an outer periphery of said piston.

7. A brake pressure control valve for a vehicle as claimed in claim 1, wherein sealing means is disposed on the outer periphery of said assistant plunger for making said third and fourth pressure chambers fluid tight relative to each other.

8. A brake pressure control valve for a vehicle as claimed in claim 7, wherein said sealing means is a rubber-like sealing cup.

9. A brake pressure control valve for a vehicle comprising, in combination, a cylinder having an inlet port and an outlet port thereon; a differential piston slidably disposed within said cylinder to subdivide the cylinder interior into first and second pressure chambers facing piston surfaces of different areas and connected respectively to a master cylinder through said inlet port and to rear-wheel brake cylinders through said outlet port; valve means cooperable with said piston for controlling the intercommunication of said first and second chambers; first spring means for biasing said piston in a direction to keep said valve means normally open; an assistant plunger slidably engaged within said piston to subdivide the piston interior into third and fourth pressure chambers, said third chamber being in open communication with said first chamber and said fourth chamber being connected to said second chamber, wherein said fourth chamber is hydraulically connected to said second chamber through an annular slit passage defined between the outer periphery of said piston and the cylinder interior wall.

* * * * *